US008621357B2

(12) United States Patent
Weber et al.

(10) Patent No.: US 8,621,357 B2
(45) Date of Patent: Dec. 31, 2013

(54) LIGHT TABLE FOR EDITING DIGITAL MEDIA

(75) Inventors: Ralf Weber, Cupertino, CA (US); Adrian Diaconu, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 553 days.

(21) Appl. No.: 12/497,462

(22) Filed: Jul. 2, 2009

(65) Prior Publication Data

US 2010/0169777 A1 Jul. 1, 2010

Related U.S. Application Data

(60) Provisional application No. 61/193,850, filed on Dec. 30, 2008.

(51) Int. Cl.
*G06F 3/00* (2006.01)
*G06F 3/01* (2006.01)

(52) U.S. Cl.
USPC ........... 715/731; 715/719; 715/723; 715/730; 715/732

(58) Field of Classification Search
USPC .......................... 715/719, 723, 730, 731, 732
See application file for complete search history.

(56) References Cited

U.S. PATENT DOCUMENTS

| 5,521,841 | A | * | 5/1996 | Arman et al. ................. 715/723 |
| 5,752,029 | A | | 5/1998 | Wissner |
| 5,758,093 | A | * | 5/1998 | Boezeman et al. ........... 709/249 |
| 5,760,767 | A | * | 6/1998 | Shore et al. ................... 715/723 |
| 5,841,438 | A | | 11/1998 | Cave |
| 5,852,435 | A | * | 12/1998 | Vigneaux et al. ............. 345/428 |
| 6,031,529 | A | | 2/2000 | Migos et al. |
| 6,067,126 | A | | 5/2000 | Alexander |
| 6,204,840 | B1 | | 3/2001 | Petelycky et al. |
| 6,320,598 | B2 | | 11/2001 | Davis et al. |
| 6,332,147 | B1 | * | 12/2001 | Moran et al. .................. 715/203 |
| 6,369,835 | B1 | | 4/2002 | Lin |
| 6,463,444 | B1 | * | 10/2002 | Jain et al. ............................... 1/1 |
| 6,580,438 | B1 | | 6/2003 | Ichimura et al. |
| RE38,401 | E | * | 1/2004 | Goldberg et al. ............. 715/720 |
| 6,744,974 | B2 | | 6/2004 | Neuman ......................... 386/96 |
| RE38,609 | E | * | 10/2004 | Chen et al. .................... 715/730 |
| 6,807,361 | B1 | * | 10/2004 | Girgensohn et al. .......... 386/227 |
| 6,928,613 | B1 | * | 8/2005 | Ishii et al. ..................... 715/726 |
| 7,030,872 | B2 | * | 4/2006 | Tazaki .......................... 345/418 |
| 7,082,572 | B2 | * | 7/2006 | Pea et al. ...................... 715/720 |
| 7,085,995 | B2 | * | 8/2006 | Fukuda et al. ................ 715/203 |
| 7,143,362 | B2 | * | 11/2006 | Dieberger et al. ............ 715/764 |

(Continued)

OTHER PUBLICATIONS

"U.S. Appl. No. 12/497,534, Examiner Interview Summary mailed Apr. 23, 2013", 3 pgs.

(Continued)

*Primary Examiner* — Nicholas Augustine
(74) *Attorney, Agent, or Firm* — Schwegman Lundberg & Woessner, P.A.

(57) ABSTRACT

A system in accordance with the present invention may include one or more processors, memory that receives instructions from the one or more processors according to a clock operating at a frequency, one or more programs stored in the memory, with instructions to: access media content, wherein the media content is associated with meta data, media characteristics, or other media-related data; couple certain of the media content to a style; and, organize the coupled certain of the media content according to the style and the meta data, media characteristics, or other media-related data.

21 Claims, 15 Drawing Sheets

(56) References Cited

U.S. PATENT DOCUMENTS

| | | | |
|---|---|---|---|
| 7,149,974 B2 * | 12/2006 | Girgensohn et al. | 715/723 |
| 7,213,051 B2 * | 5/2007 | Zhu et al. | 709/205 |
| 7,352,952 B2 | 4/2008 | Herberger et al. | |
| 7,469,054 B2 | 12/2008 | Aratani et al. | |
| 7,512,886 B1 | 3/2009 | Herberger et al. | |
| 7,528,315 B2 | 5/2009 | Goodwin et al. | |
| 7,669,132 B2 | 2/2010 | Widdowson | |
| 7,890,867 B1 | 2/2011 | Margulis | |
| 7,979,801 B2 * | 7/2011 | Krishnaswamy et al. | 715/730 |
| 2002/0143961 A1 | 10/2002 | Siegel et al. | |
| 2002/0154140 A1 * | 10/2002 | Tazaki | 345/620 |
| 2002/0154158 A1 | 10/2002 | Fukuda et al. | |
| 2003/0090506 A1 | 5/2003 | Moore et al. | |
| 2003/0091204 A1 | 5/2003 | Gibson | |
| 2003/0184598 A1 * | 10/2003 | Graham | 345/838 |
| 2003/0189588 A1 * | 10/2003 | Girgensohn et al. | 345/723 |
| 2004/0027369 A1 | 2/2004 | Kellock et al. | |
| 2004/0255307 A1 | 12/2004 | Irudayaraj | |
| 2005/0084232 A1 | 4/2005 | Herberger et al. | |
| 2005/0275805 A1 | 12/2005 | Lin et al. | |
| 2006/0075348 A1 | 4/2006 | Xu et al. | |
| 2006/0152678 A1 | 7/2006 | Hung et al. | |
| 2007/0006073 A1 | 1/2007 | Gerhard et al. | |
| 2007/0146388 A1 | 6/2007 | Langmacher et al. | |
| 2007/0163427 A1 | 7/2007 | Rigopulos et al. | |
| 2007/0180979 A1 | 8/2007 | Rosenberg et al. | |
| 2008/0077710 A1 | 3/2008 | Kouvelas et al. | |
| 2008/0079690 A1 | 4/2008 | Foxenland et al. | |
| 2008/0098032 A1 | 4/2008 | Wu et al. | |
| 2008/0162228 A1 | 7/2008 | Mechbach et al. | |
| 2008/0183751 A1 | 7/2008 | Cazier et al. | |
| 2008/0215979 A1 | 9/2008 | Clifton et al. | |
| 2009/0187826 A1 * | 7/2009 | Heimbold et al. | 715/719 |
| 2010/0085379 A1 | 4/2010 | Hishikawa et al. | |
| 2010/0168881 A1 | 7/2010 | Weber et al. | |
| 2010/0169784 A1 | 7/2010 | Weber et al. | |

OTHER PUBLICATIONS

"U.S. Appl. No. 12/497,534, Final Office Action mailed Feb. 5, 2013", 17 pgs.

"U.S. Appl. No. 12/497,534, Non Final Office Action mailed Jul. 20, 2012", 12 pgs.

"U.S. Appl. No. 12/497,534, Response filed May 3, 2013 to Final Office Action mailed Feb. 5, 2013", 11 pgs.

"U.S. Appl. No. 12/497,534, Response filed Nov. 20, 2012 to Non-Final Office Action mailed Jul. 20, 2012", 11 pgs.

"U.S. Appl. No. 12/497,541, Final Office Action mailed Jun. 13, 2012", 11 pgs.

"U.S. Appl. No. 12/497,541, Non Final Office Action mailed Jan. 23, 2013", 13 pgs.

"U.S. Appl. No. 12/497,541, Non Final Office Action mailed Dec. 28, 2011", 11 pgs.

"U.S. Appl. No. 12/497,541, Response filed Mar. 22, 2012 to Non Final Office Action mailed Dec. 28, 2011", 13 pgs.

"U.S. Appl. No. 12/497,541, Response filed Oct. 15, 2012 to Final Office Action mailed Jun. 13, 2012", 10 pgs.

"U.S. Appl. No. 12/499,794, Non Final Office Action mailed Oct. 25, 2012", 12 pgs.

"U.S. Appl. No. 12/499,794, Response filed Mar. 22, 2013", 9 pgs.

* cited by examiner

LIGHT TABLE FOR EDITING DIGITAL MEDIA

This application claims the benefit and priority of the U.S. Provisional Patent Application No. 61/193,850 filed on Dec. 30, 2008, which is hereby incorporated by reference.

FIELD OF INVENTION

The present invention relates generally to the field of media presentations and, in particular, to authoring media presentations.

BACKGROUND OF INVENTION

Current applications offer features for editing image and video files, such as editing photos by cropping, skewing, altering dimensions/colors, and adding/removing photo objects; and, for videos, by adding/removing clips/segments, attaching audio to a clip/segment, and adding/removing video objects. Furthermore, file management or media presentation/slideshow applications also provide a feature such that a group of image or video files may be viewed (e.g., as thumbnails) and organized via a file management folder and, also, media presentation/slideshow applications provide a feature for manually adding photos or videos to slides, which may then be played sequentially. In addition, some applications may provide features for manually customizing digitized photo/video albums, where the user may simply associate specific photos/videos with an album, or the application may add a group of photos/videos to an album merely based on a common storage location or as the user may specify. However, current applications do not provide a feature for authoring media presentations, comprising: accessing media content, wherein the media content is associated with meta data, media characteristics, or other media-related data; coupling certain of the media content to a style; and, organizing the coupled certain of the media content according to the style and the meta data, media characteristics, or other media-related data. Moreover, current applications also do not provide a feature for presenting the organized media content and, further, displaying the organized media content using a graphical user interface (e.g., a light table).

SUMMARY OF THE INVENTION

Accordingly, the present invention is directed to a system and method for authoring media presentations that substantially obviates one or more problems due to limitations and disadvantages of the related art.

An embodiment of the present invention provides a computer-implemented method for authoring media presentations, comprising: accessing media content, wherein the media content is associated with meta data, media characteristics, or other media-related data; coupling certain of the media content to a style; and, organizing the coupled certain of the media content according to the style and the meta data, media characteristics, or other media-related data.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a system comprises one or more processors; memory; one or more programs stored in memory, the one or more programs comprising instructions to: access media content, wherein the media content is associated with meta data, media characteristics, or other media-related data; couple certain of the media content to a style; and, organize the coupled certain of the media content according to the style and the meta data, media characteristics, or other media-related data.

In another aspect, a computer-readable storage medium stores one or more programs configured for execution by a computer, the one or more programs comprising instructions to: access media content, wherein the media content is associated with meta data, media characteristics, or other media-related data; couple certain of the media content to a style; and, organize the coupled certain of the media content according to the style and the meta data, media characteristics, or other media-related data.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of the specification, illustrate embodiments of the invention and together with the description serve to explain the principles of the invention. In the drawings.

DETAILED DESCRIPTION

Reference will now be made in detail to embodiments, examples of which are illustrated in the accompanying drawings. In the following detailed description, numerous non-limiting specific details are set forth in order to assist in understanding the subject matter presented herein. It will be apparent, however, to one of ordinary skill in the art that various alternatives may be used without departing from the scope of the present invention and the subject matter may be practiced without these specific details. For example, it will be apparent to one of ordinary skill in the art that the subject matter presented herein can be implemented on any type of standalone system or client-server compatible system containing any type of client, network, server, and database elements.

Figure 1:
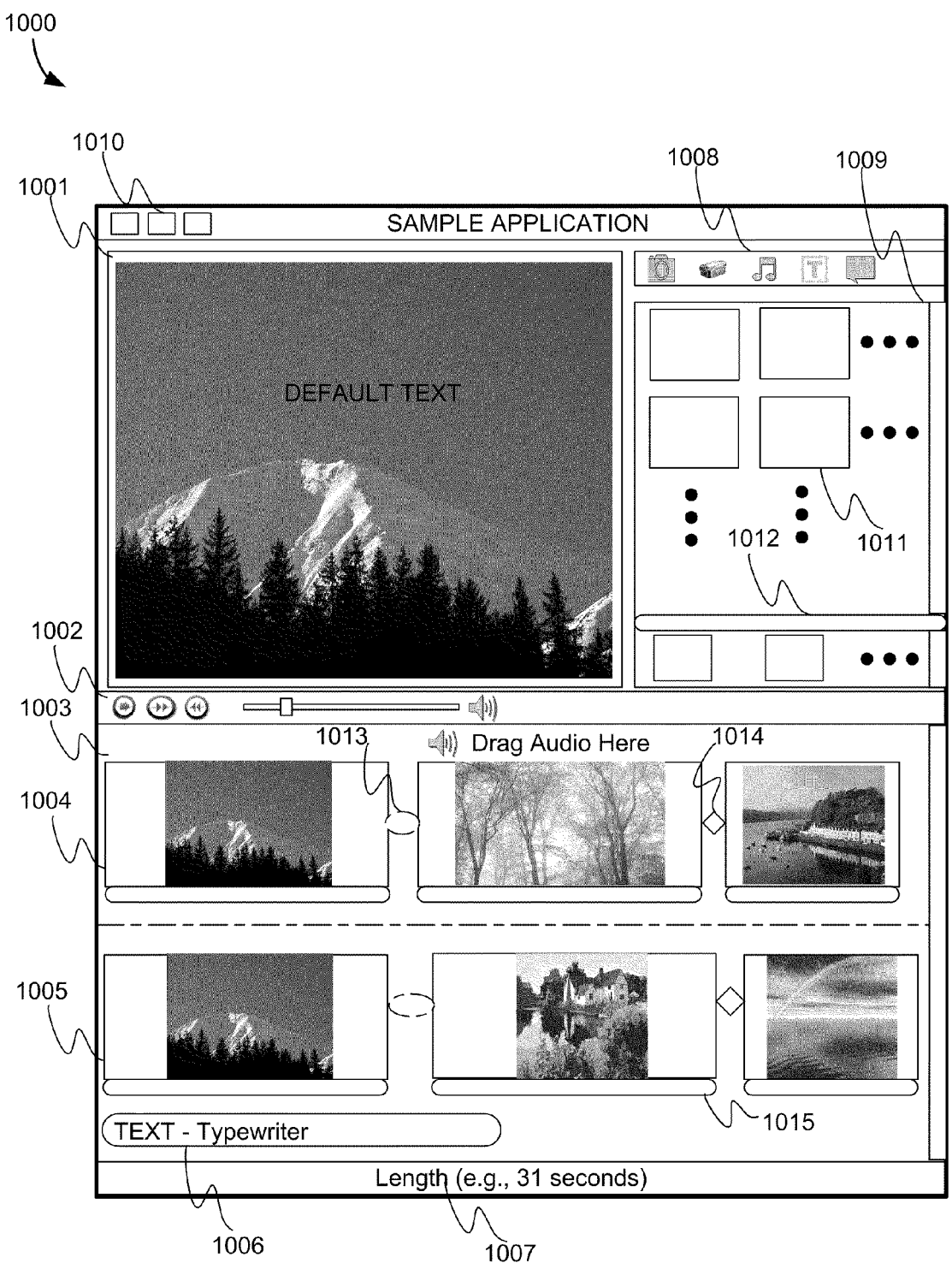
FIG. 1 illustrates an exemplary embodiment of an application in accordance with the present invention.

FIG. 1 illustrates an exemplary embodiment of an application in accordance with the present invention. The exemplary embodiment of an application 1000 comprises a document 1001, a set of controls 1002 for controlling/manipulating the document 1001, an edit layers and effect containers region 1003 (e.g., steps 6001, 7001), a background layer 1004 with effect containers and effects associated with the effect containers, a foreground layer 1005 with effect containers and effects associated with the effect containers, a text typewriter 1006 for associating text with one or more effect containers/effects/slides, a document length 1007 indicator, a select media content menu 1008 (e.g., steps 6002, 7002), a main effects library 1009, a documents selection menu 1010 for selecting among available documents, one or more effects 1011 (which may be available according to a filter criteria) within the main effects library 1009, a subset of the main effects library 1012, a gap variable 1013 for separating an effect or effect container (with one or more effects and slides) from the next effect or effect container using a gap, a transition variable 1014 for separating an effect or effect container (with one or more effects and slides) from the next effect or effect container using a transition, and an effect style 1015 (also, name or property). The exemplary embodiment of an application 1000 illustrates a use of the application 1000 to create a document 1001 (e.g., steps 6004, 7004) using a background layer 1004, a foreground layer 1005 (additional background/foreground layers may also be added to the document but may not be illustrated in FIG. 1) (e.g., steps 7008, 7009), customized gaps 1013 and/or transitions 1014 separating effect containers. Effect containers may comprise, for example, one or more effects from, for example, the main effects library 1009 or the subset of the main effects library 1012; and, effects may further comprise one or more slides like, for example, images, movies, audio, text (e.g., a string with font information that may determine how text will look and feel), and other media content (e.g., steps 6002, 7002, 7006, 7012, 7013). Effects may determine how the image and its surroundings will appear on a screen/display during play (e.g., an image may be displayed according to "book theme," where the effect would be the feature/component for determining how the photos may be laid out or organized on-screen; an effect may store/pass information related to how a photo would bounce around on a screen; or, an effect may also store/pass information related to text, where the text may be added or associated with a slide, effect, layer, or document of a slideshow/media presentation). Further, effects may be filtered according to media content type using the select media content menu 1008. For example, images, video, audio, text, and captions may be used to filter effects accordingly. Meaning, the relevant effects associated with each of the foregoing types of media content may be displayed accordingly upon invocation of the respective menu item from the select media content menu 1008. Details regarding effects may be displayed in the effects style 1015 section, which may be positioned beneath each respective effect container, and corresponding to a presently active effect, in the effect containers region 1003.

In some embodiments, the exemplary embodiment of an application 1000, and its features/components, may be implemented by one or more modules/engines (FIG. 3A, reference numerals 3020-23) executed using an exemplary system 4000 (FIG. 4) with a central processing unit (CPU) 4001 (and, alternatively, multiple CPUs), memory 4002 for storing data (e.g., instructions from an operating system 4007 or one or more programs (e.g., 4008, 4009)) to be fetched by the CPU for execution, a display device 4003 for displaying the exemplary application 1000 using a graphics module to a display screen, a network interface card (NIC) 4004 for sending and receiving data over a wired or wireless communications network, local storage 4006 for storing media content and other data (e.g., an operating system 4007, the exemplary embodiment of an application 1000, other applications, etc.), and auxiliary device(s)/component(s) 4005 (e.g., TV (or, other display), portable storage, portable media player, etc.), which may all be connected via a bus for sending and receiving data according to a frequency (e.g., synchronous or asynchronous).

In some embodiments, the features/components of the application 1000 may be described as follows. The document 1001 (also, FIG. 3, reference numeral 3001) is the top level object of the media presentation/slideshow that may be created (e.g., steps 6004, 7004) using the exemplary application 1000. The document is the object that may comprise: all of the custom/default layers 1004, 1005 (also, FIG. 3, reference numeral 3002) (e.g., steps 6003, 7003, 7010), effect containers such as, for example, those within the effect containers region 1003 (also, FIG. 3, reference numeral 3003); effects such as, for example, those within the effect containers (also, FIG. 3, reference numeral 3004); gaps 1013 or transitions 1014 for separating or linking effects, respectively (also, FIG. 3, reference numeral 3012); slides such as, for example, the images of FIG. 1 or other media content as described above (also, FIG. 3, reference numeral 3005, 3010) (e.g., step 6002, 7002); frames 3006; a document/layer/effect stack 3007; a layer/effect/slide/filter stack 3011; a playlist 3008; an animation path 3014; a song 3009; a keyframe 3015 (which may, for example, be one dimensional (1D) 3016, two dimensional (2D) 3017 or a vector (3018)); filters 3019; a layer/effect container/effect/slide/filter stack 3013; and, any other possible combination of the aforementioned. Moreover, a document may contain layers that may be stacked/placed one on top of another to provide the media presentation/slideshow with an added level of flexibility in what is available for actual display (e.g., steps 6003, 7003, 7010). Accordingly, the application supports the presentation of less than all of the available layers. Stacking may involve a process, for example, of logically associating, or linking, layers. That is, a background layer 1004 may be considered the lowest level layer in a stack of layers, followed by a foreground layer 1005 and a plurality of other foreground layers, all of which would be logically associated according to their position from, for example, background layer 1004, or from each other foreground layer. During display/play of a document such as, for example, document 1001, the layers would be displayed/played according to their respective positions in the stack (logical associations). The next feature/component is the layers 1004 (background), 1005 (foreground) (also, FIG. 3, reference numeral 3002) within a document 1001 (also, FIG. 3, reference numeral 3001) (e.g., steps 6001, 7001). Each layer 1004, 1005 of a stack of layers (e.g., aggregated layers; steps 6003, 7003) within a document can be positioned, sized, and rotated using the exemplary application 1000. Further, each layer 1004, 1005 may also have a custom audio file/track (or, alternatively, a set of audio files/tracks, or other media content) associated with it and other layers 1004, 1005, thus, providing a media presentation/slideshow with multiple audio files/tracks during presentation (e.g., steps 6002, 7002). Each layer 1004, 1005 may also contain effect containers (like, for example, those illustrated in the effect containers region 1003) (e.g., steps 6002, 7002), which may be linked together in a layer using transitions 1014 (also, FIG. 3, reference numeral 3012) or separated from one another using gaps 1013 (or, alternatively, some other effect separation variable like, for example, random separation/transition, or a combination of gaps and transitions, etc.) (e.g., 7005). Transitions 1014, which through visual action/expression may create the appearance that two effect containers are linked together, may be able to provide a rather "fluid" (or, alternatively, a "non-fluid") experience between effect containers when presenting a media presentation/slideshow. For example, transitions may be the visual action/expression of a page flipping, a slide dissolving, a slide being pushed along in any direction, a cube breaking apart (or, being assembled), a page rolling for the purpose of unveiling/hiding contents, a puzzle being assembled (or, disassembled), or any other type of visual action/expression applied to an effect container or slide and capable of being rendered on a display device. Slides in the exemplary application may be the actual image, movie, text, or other media content that may be within an effect, which may be within an effect container (e.g., steps 6002, 7002). Slides may have frames applied as an added layer (e.g., on top), where a frame may be a visual element/expression such as, for example, making an image appear as if it was taken using an instant photo camera (e.g., Polaroid®), is part of a filmstrip, has a solid/dashed/shadowed/other border surrounding it, or other type of frame-related visual element/expression. Further, each slide may have an animation path 3014 that may determine which part of a slide image, movie, text, or other media content, is actually displayed/played; similarly, an animation path 3014 associated with the slide may cause a panning/zooming effect to be executed on the image, movie, text, or other media content, where the panning/zooming may occur within the effect of the slide. As applied to a layer, a user may also customize an animation path 3014 via the exemplary application 1000 to, for example, smoothly transition a layer's rotation from around zero (0) degrees all the way to three hundred sixty (360) degrees, over a default or custom period of time (e.g., steps 6002, 7002). In some embodiments, transitions 1014 may have durations associated with them to determine how long the transitions are played. The transition duration may be subtracted directly from the total duration of the effect containers separated/divided by the transition. For example, when transitioning from an effect container with a three (3) second duration to another effect container with a three (3) second duration, that is, having a six (6) second total duration, using a transition with a one (1) second duration, the effect containers may only be played for a total of five (5) seconds (i.e., the total six (6) second duration of the effect containers minus the one (1) second transition display/play duration leaves five (5) seconds of display/play duration for the effect containers).

In some embodiments, effect containers may be able to determine the order that images (or, alternatively, other media content) associated with a layer (e.g., steps 6002, 7002) are presented during a media presentation/slideshow. Such a determination may be based according to characteristics associated with the images (or, alternatively, other media content) (e.g., steps 6004, 7004). The characteristics may comprise a resolution, size, quality indicator, dots-per-inch, frames per second, window size, bit error rate (BER), compression type, or some other media content characteristic. The exemplary application 1000 may execute this process of assembling the layers (e.g., steps 6004, 7004) either manually or according to algorithms processing the characteristics and other layer-related data (described above). Further with respect to effect containers (e.g., a container or group of effects), multiple effects may be transitioned as one set into the next effect container. For example, effect containers are necessary in order for different text to be displayed on top of different effects. In some embodiments, from an implementation viewpoint, the effect containers permit the logical/physical grouping of different effects and link each of the effects to their respective different text, which is to be displayed on top of each respective effect. Each effect container may, for example, further contain a variable for storing a specific duration for determining how long each of the effects associated with an effect container (or, alternatively, "within" the effect container) are displayed/played.

In some embodiments, a keyframe 3015 (which may, for example, be one dimensional (1D) 3016, two dimensional (2D) 3017 or a vector (3018)), may be used by an animation path 3014 to guide or instruct the rate at which animation path 3014 should operate. Meaning, the higher the value of a keyframe 3015, the increased rate the animation path 3014 may operate (e.g., a faster pan-zoom effect or a faster layer rotation), and the lower the value of a keyframe 3015, the lower rate the animation path 3014 may operate at (e.g., a slower pan-zoom effect or a slower layer rotation). A 1D 3016 keyframe may be a keyframe that animates a property that has one value like, for example, a rotation angle. A 2D 3017 keyframe may be a keyframe that animates a property that has more than one value like, for example, a position (x-axis point, y-axis point) or a size (width/length, height). And, a vector 3018 keyframe may be a keyframe that animates a property that has more than two values like, for example, colors that manipulate the different values of their constituent color components (e.g., red, green, blue, alpha).

In some embodiments, filters 3019 operate as visual elements that are applied to a layer, effect container, effect, or slide. A filter 3019 may be, for example, a shadow, blurred image, or some other compatible visual element capable of being applied to a layer, effect container, effect, or slide (e.g., steps 6002, 7002).

In some embodiments, a playlist 3008 associated with a document 1001 may contain a list of songs (e.g., steps 6002, 7002). The playlist 3008 may organize songs such that they are played in a specific order, determined manually by a user of the exemplary application 1000, or automatically through the exemplary application 1000. An automatic playlist may be created according to song genre, file characteristics (e.g., type, size, date, etc.), or according to the feature for dynamically profiling a slideshow soundtrack based on various criteria like beats per minute (BPM), rhythmic strength (RS), harmonic complexity (HC), and/or root mean square density (RMS or RMS strength). The songs (e.g., a reference to a playlist) may be stored in digital format in local storage 4006 or on an auxiliary device/component 4005 that communicates with the system 4000 through a communications protocol or standard. The songs may be stored in a single file (or, other logical/physical data aggregator) or many files. In addition to songs, a playlist 3008 may contain other compatible media content like videos with audio content (which, for example, may be parsed from the video file into an individual song/audio file, or playlist). To associate a playlist, song/audio file, or any compatible media content with a document 1001, the user may select it/them from the select media content 1008 menu and drag the respective playlist, song/audio file, or other compatible media content, via the exemplary application 1000, into the effect containers region 1003 (see, for example, the reference to "Drag Audio Here" in the exemplary application 1000) (e.g., steps 6002, 7002). Songs may be played in the background while a document is being displayed/played, or they may, alternatively, be associated with foreground layers or effects that may be organized on top of another, thus, enabling the songs to be switched in coordination with the various switching (e.g., via gaps or transitions) from one layer or effect to another (e.g., steps 6004, 7004). Further, songs may, according to a default setting, start and stop playing based on the start and stop times that may be given from a media player or media management application. The user of the exemplary application 1000 may, however, define a custom start or stop time via a song (or, playlist) menu option of the application 1000.

Figure 2:
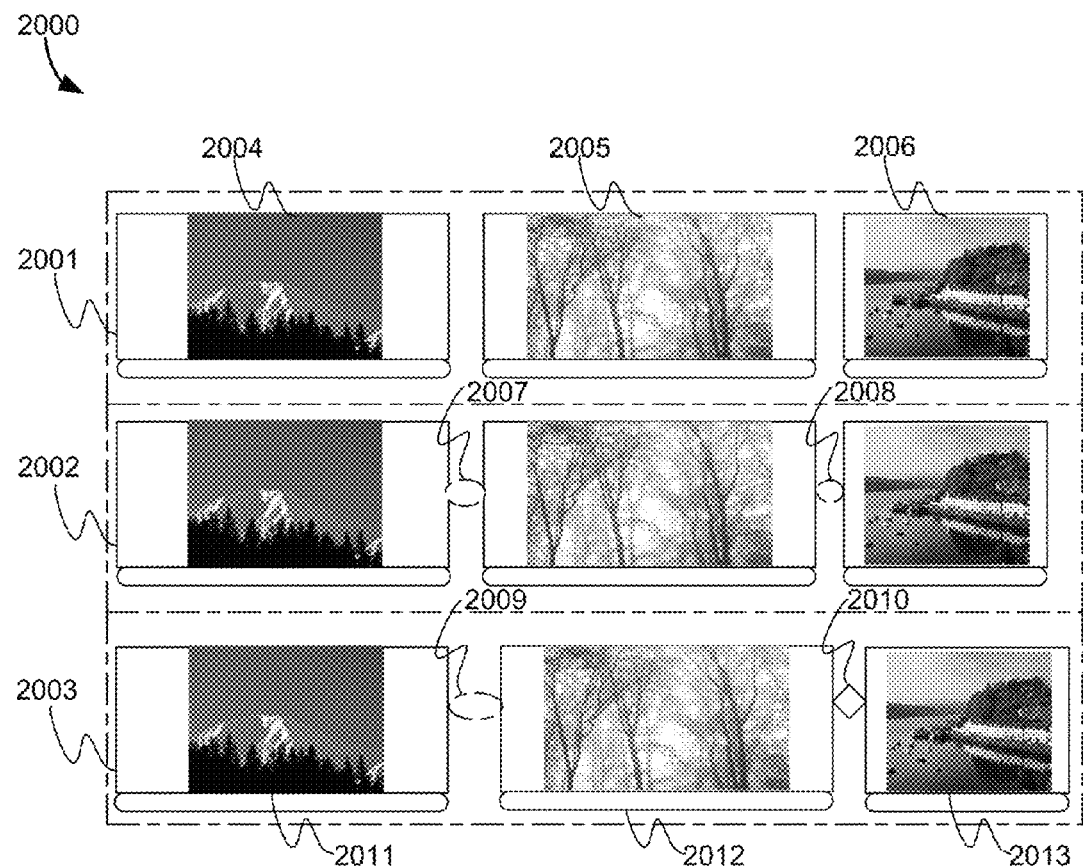
FIG. 2 illustrates features of an exemplary embodiment in accordance with the present invention.

FIG. 2 illustrates features of an exemplary embodiment in accordance with the present invention. As illustrated, the exemplary embodiment of an add effects container region 2000 (similar to that of 1003; FIG. 1) contains three layers, the first is a background layer 2001, and the second and third are foreground layers 2002 and 2003 (e.g., steps 6001, 7001, 6002, 7002, 7008, 7009). Effect containers are illustrated as 2004, 2005, and 2006 in the background layer 2001. The foreground layers 2002 and 2003 also contain effect containers. Each effect container has effects with slides/media content within, such as illustrated by the slides (e.g., images) 2011 and 2013 in the second foreground layer 2003. Moreover, gaps 2007, 2008, 2009 separate effect containers in foreground layers 2002 and 2003. Also, transition 2010 separates (or, "link") effect containers in the foreground layer 2003. Further, an effects style 2012 is illustrated for the second effect container of the second foreground layer 2003 (e.g., step 7007). The effects style may display one or more styles or properties such as, for example, a media presentation order, a thumbnail, a layout, a position, a size, a zPosition (e.g., the position in a three-dimensional (x, y, z) orientation), a base period, an effect presets, an effect settings overwrite, a matching layer duration, a recommended effect duration, a transition preset, a transition settings overwrite, a recommended transition duration, a filter preset, a filter preset criteria, a filter likelihood, a gap likelihood, a layer importance, a slide filter preset criteria, a slide frames criteria, an automatic filter likelihood, and a support per-slide customization (e.g., step 7014). Other styles or properties may also be displayed at 2012 or in another section of the graphical user interface of the exemplary application 1000 or at the container region 2000 like, for example, a background color and an automatic filter mode (e.g., step 7015). The styles or properties may apply to the effects, effect containers, layers, and/or document, and may further be customized for each of the foregoing or inherited from each other, whether set by default or is customized (e.g., step 7007).

Figure 2A:
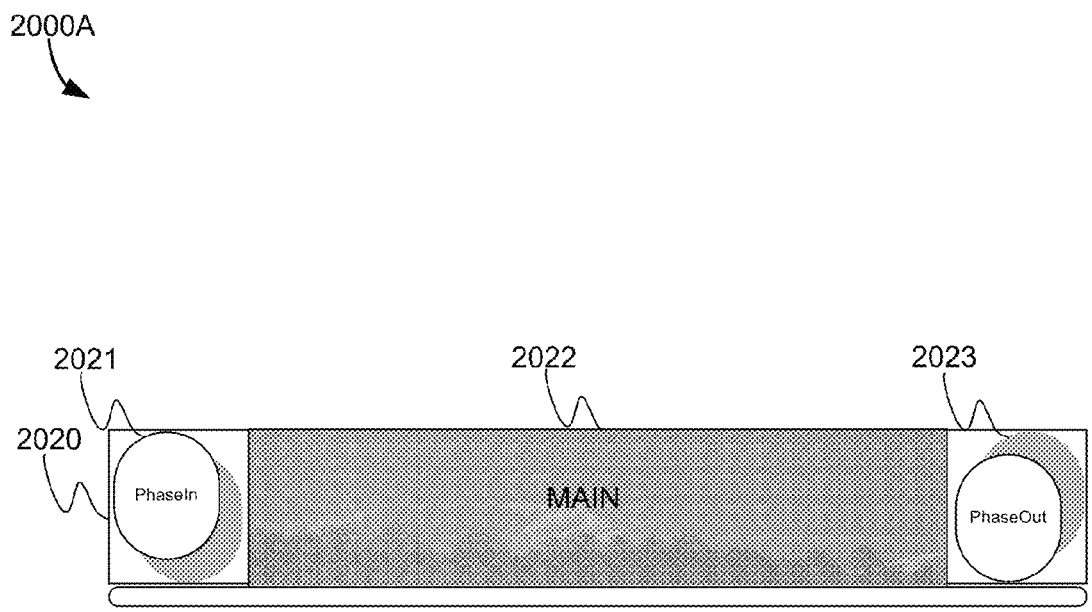
FIG. 2A illustrates features of an exemplary embodiment in accordance with the present invention.

FIG. 2A illustrates features of an exemplary embodiment in accordance with the present invention. The exemplary embodiment 2000A illustrates an effect container 2020 with a phaseIn effect 2021, a main effect 2022, and a phaseOut effect 2023. Also, the blurred image (or, movie or other media content) shown behind the "main" text illustrates an exemplary instance of a blurred effect during the main effect 2022 phase of the effect container 2020. The phaseIn effect 2021 (e.g., like a fade-in) may be used, for example, to build a single/multi-slide layout, where as the phaseOut effect 2023 (e.g., like a fade-out) may be used, for example, to tear down/away or remove a single/multi-slide layout. Thus, the phaseIn 2021, main 2022, and phaseOut 2023 effects may be applied to a single slide or to multiple slides. Furthermore, there may be a time associated with each phaseIn effect 2021, main effect 2022, and phaseOut effect 2023. The time spent on each slide of a multi-slide effect may be equally divided among the individual slides (e.g., total effect time divided by the total number of slide, and adjusted accordingly) or apportioned in a custom manner to each individual slide.

Figure 3:
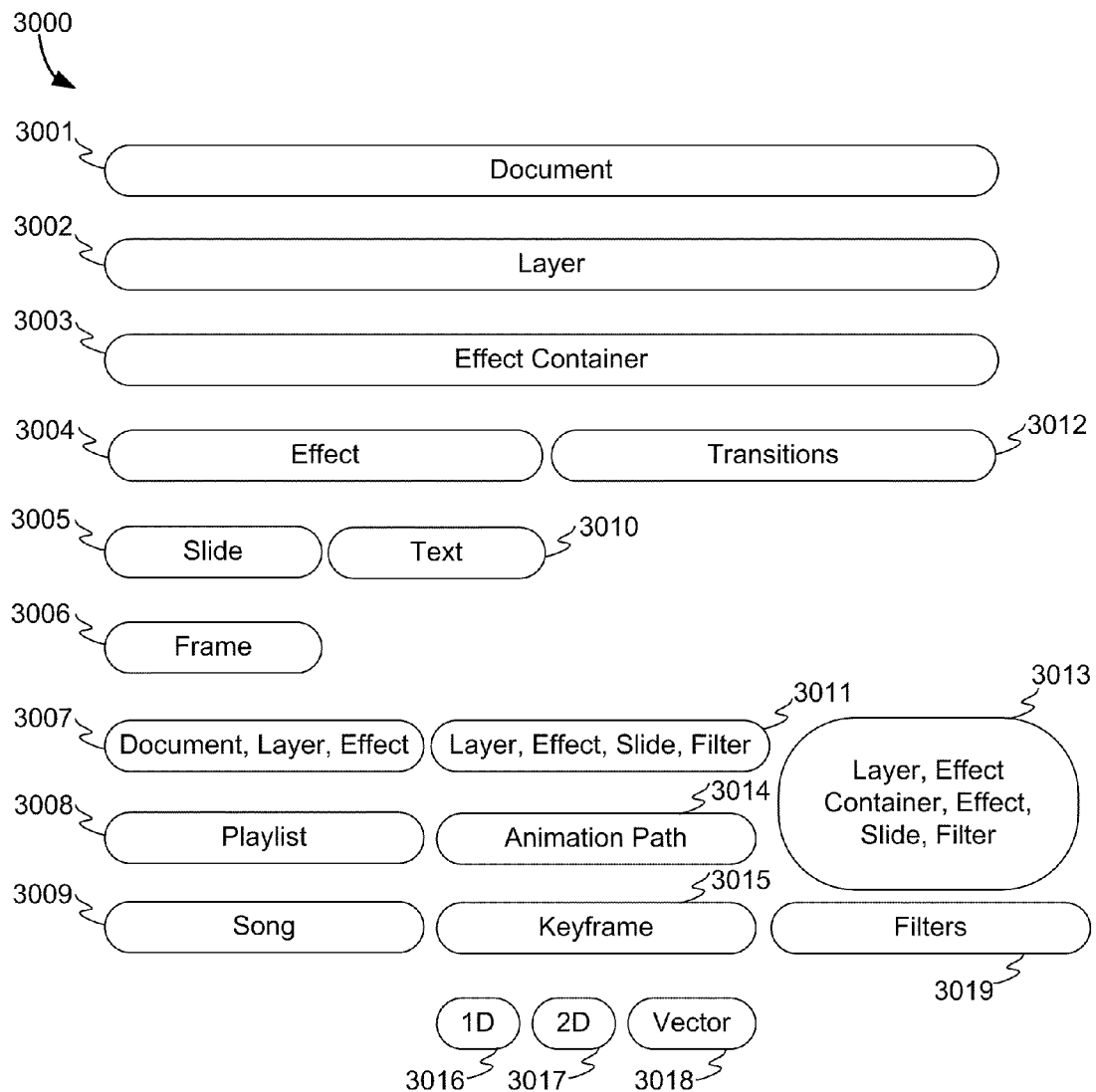
FIG. 3 is a block diagram illustrating framework features of an exemplary embodiment in accordance with the present invention.

FIG. 3 is a block diagram illustrating framework features of an exemplary embodiment in accordance with the present invention. In some embodiments, the exemplary application 1000 executing on the exemplary system 4000 may cause the CPU 4001 to execute instructions for creating an electronic structure (e.g., 3000) for storage in memory 4002, local storage 4006, or on an auxiliary device/component 4005, such instructions may comprise: creating a document (e.g., 3001); associating one or more layers (e.g., 3002) to the document, wherein the layers (e.g., 3002) are organized within the document (e.g., 3002); associating one or more effect containers (e.g., 3003) with the layers, wherein the effect containers (e.g., 3003) are linked and are organized within the layers (e.g., 3003); associating one or more effects (e.g., 3004) with the effect containers (e.g., 3004); and assembling the effects (e.g., 3004), effect containers (e.g., 3003), and layers (e.g., 3002) logically within the document. The application features 3000-3019 are referred to and described in detail herein, and in view of the exemplary application 1000, which may be executed, for example, on the exemplary system 4000.

Figure 3A:
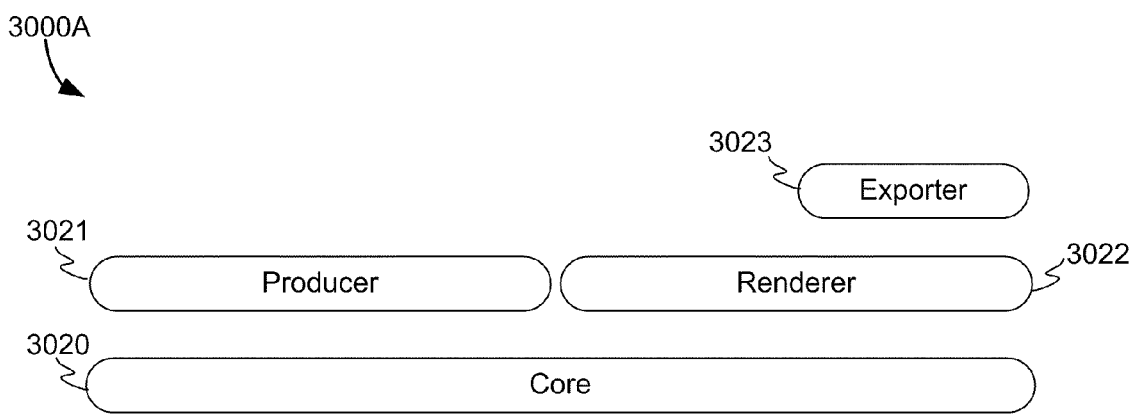
FIG. 3A is a block diagram illustrating framework features of an exemplary embodiment in accordance with the present invention.

FIG. 3A is a block diagram illustrating framework features of an exemplary embodiment in accordance with the present invention. The framework features 3000A may comprise framework module units (or, modules) such as, for example, a core 3020, a producer 3021, a renderer 3022, and an exporter 3023. The features 3000A may implement the structure/architecture of the exemplary application 1000, and may be executed, for example, using a system like that illustrated in FIGS. 4-5.

In some embodiments, the core 3020 module may be considered the low-level data structure module and it may, for example, perform routines for representing how a slideshow/media presentation document is constructed, and contain the necessary information for accurately representing a slideshow/media presentation document according to features, many of which are described herein (e.g., steps 6001-6003, 7001-7003). Some of those features may include, for example, features related to timing (e.g., gaps 1013, transitions 1014), positioning (e.g., background layer 1004, foreground layer 1005, effects of effect containers 2004-2006, slides 2011, filters 3019, text 3010), sizing (e.g., keyframe 3015, animation path 3014, as well as their interaction), and files (e.g., songs 3008, playlists 3009).

In some embodiments, the producer 3021 may be considered the module for creating how a slideshow will look and feel (e.g., steps 6002-6003, 7002-7003), performing several analyses related to media content (e.g., images, audio, video of layers, effect containers, effects, and slides) (e.g., step 7016), and automatically assembling slideshows/media presentations according to data that may result from the analyses (e.g., steps 6004, 7004, 7011). The several analyses (e.g., step 7016) may include analysis of characteristics related to layers, effect containers, effects, and slides. Such characteristics may include, for example, layer type (e.g., background 1004, foreground 1005), layer number (e.g., position in relation to the background-most layer 1004), number of effect containers, length of gaps 1013 and transitions 1014, type of transitions 1014, type of effects, number of effects, number of slides, type of slides, document length 1004, user preferences (e.g., for ordering layers, effect containers, effects, slides), audio analyses, video analyses, or other similar characteristics. After performing the several analyses using, for example, the producer 3021, the resulting data from the several analyses may be processed by the producer 3021, the core 3020, the renderer 3022, the exporter 3023, or other module (e.g., step 7017). The producer 3021 may, for example, interface with and utilize the application programming interfaces (API) of frameworks like, for example, browsers or QuickTime® to gather such information as thumbnail data and resolutions for images, as well as audio or video durations or other characteristics. The gathered information may then be processed by the producer 3021 in accordance with one or more general/specific algorithms (or, other analytical methods) and then used by the producer 3021 (or, other module with which the producer 3021 may call), for example, to automatically assemble a slideshow or media presentation document (e.g., 7011). The producer 3021 may further, for example, assemble a document via core 3020 for play/display using the features of renderer 3022, by accessing photos and coupling such photos with a style (e.g., 1015). In addition, the producer 3021 may also, for example, perform audio analysis functions on songs 3009 or a set of songs (playlist 3008) using such analysis like, for example, beat detection/mapping. The producer 3021 may also keep track of available styles (e.g., 1015), effects 3004, transitions 3012, and frames 3006.

In some embodiments, the renderer 3022 may be considered the play/display module. The renderer 3022 may receive slideshow/media presentation data from, for example, the core 3020 and producer 3021 and may render such data such that it may be sent to a graphics card or other display device (or interface) (e.g., 4003). The renderer 3022 may interface with QuickTime® media player (e.g., the framework of QuickTime® media player) or another compatible application (or, framework) for audio/video decoding. In addition, the renderer 3022 may also interface with a composer-type application for actual rendering (e.g., of the slides), and the same or another similar application for applying filters 3006.

In some embodiments, the exporter 3023 may be considered the sharing module. The exporter 3023 may, for example, use renderer 3022 to export the slideshow/media presentation document to different formats (e.g., file formats) like those supported by QuickTime® or other similar applications. The exporter 3023 may, for example, obtain movie frame-type data from renderer 3022 and add it to a movie-type file. When the exporter 3023 is finished retrieving data for each movie, the slideshow/media presentation document would be available for access and sharing through the exemplary application 1000 or other applications that may access or handle the document in its final format.

Figure 4:
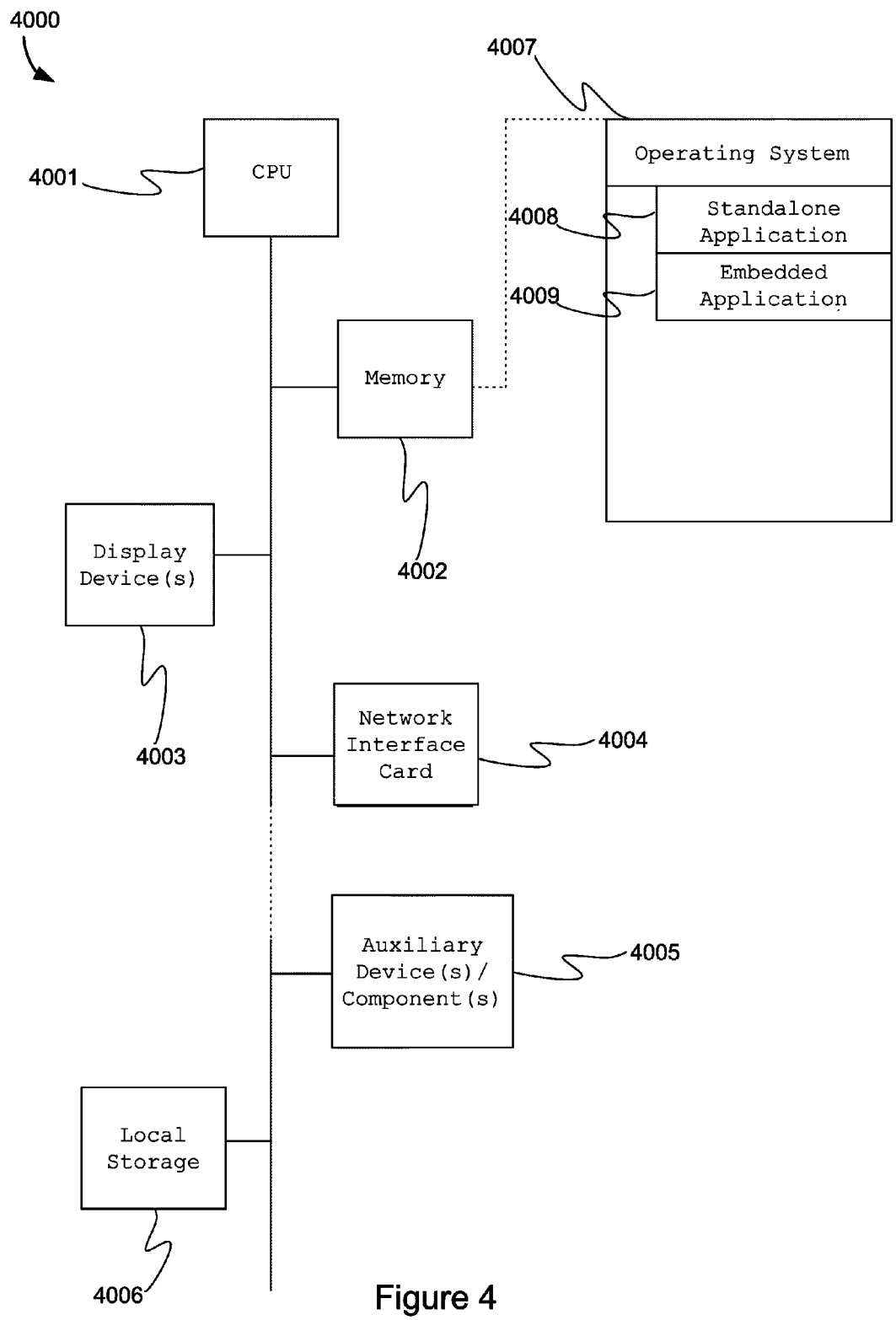
FIG. 4 illustrates an exemplary system implementing an application in accordance with the present invention.

FIG. 4 illustrates an exemplary system implementing an application in accordance with the present invention. The exemplary system 4000, described above, may implement the exemplary application 1000. Other modules and other routine programming-related matters may not be shown in FIG. 4, but would be understood and may be implemented by one of ordinary skill in the art without departing from the scope of the present invention.

Figure 5:
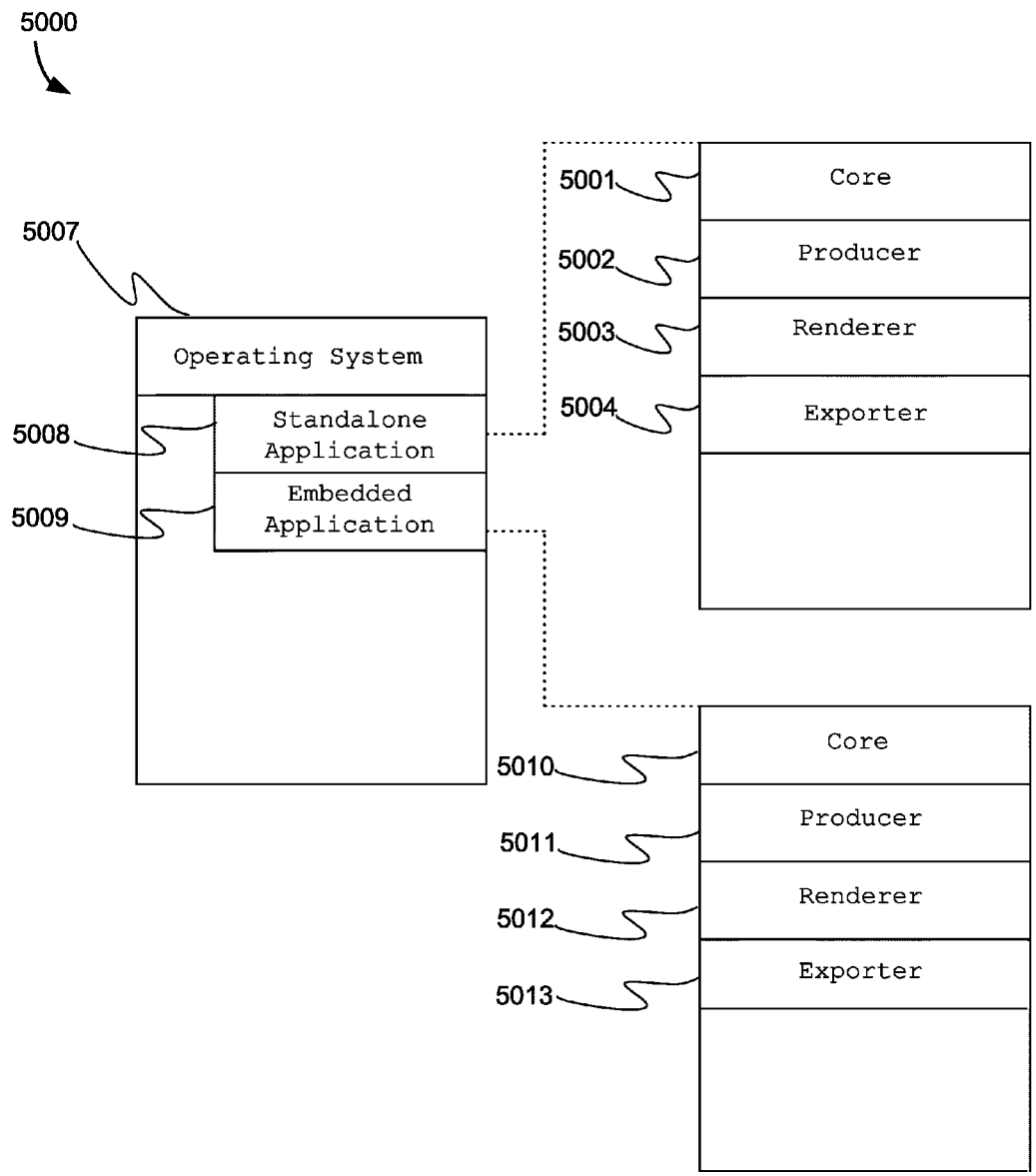
FIG. 5 illustrates an exemplary implementation of an application in accordance with the present invention.

FIG. 5 illustrates an exemplary implementation of an application in accordance with the present invention. The module units 5001-5004 and 5010-5013 of the exemplary implementation of an application 5000 are described more fully above for FIG. 3A. The module units 5001-5004 and 5010-5013 may be implemented, for example, by a standalone 4008, 5008 or an embedded 4009, 5009 application, respectively. Further, an exemplary system such as that illustrated in FIG. 4 may execute the standalone 4008, 5008 or embedded 4009, 5009 applications. Other compatible or similar systems may also execute the applications 4008, 5008 and 4009, 5009 without departing from the scope of the present invention.

Figure 6:
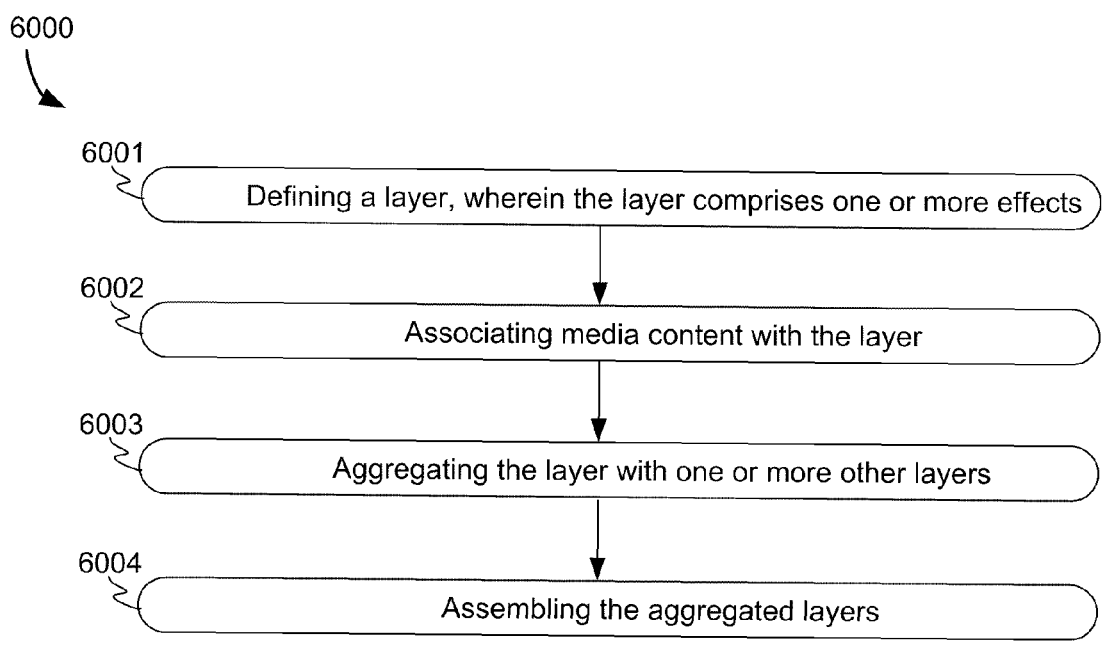
FIG. 6 illustrates an exemplary method in accordance with the present invention.

FIG. 6 illustrates an exemplary method in accordance with the present invention. The exemplary method 6000 comprises the following computer-implemented steps: defining a layer, wherein the layer comprises one or more effects 6001; associating media content with the layer 6002; aggregating the layer with one or more other layers 6003; and assembling the aggregated layer 6004. The exemplary method 6000 and, further, steps 6001-6004 may be implemented using an exemplary system such as that embodied in FIG. 4, which may execute the exemplary application 1000, and as described herein.

Figure 7:
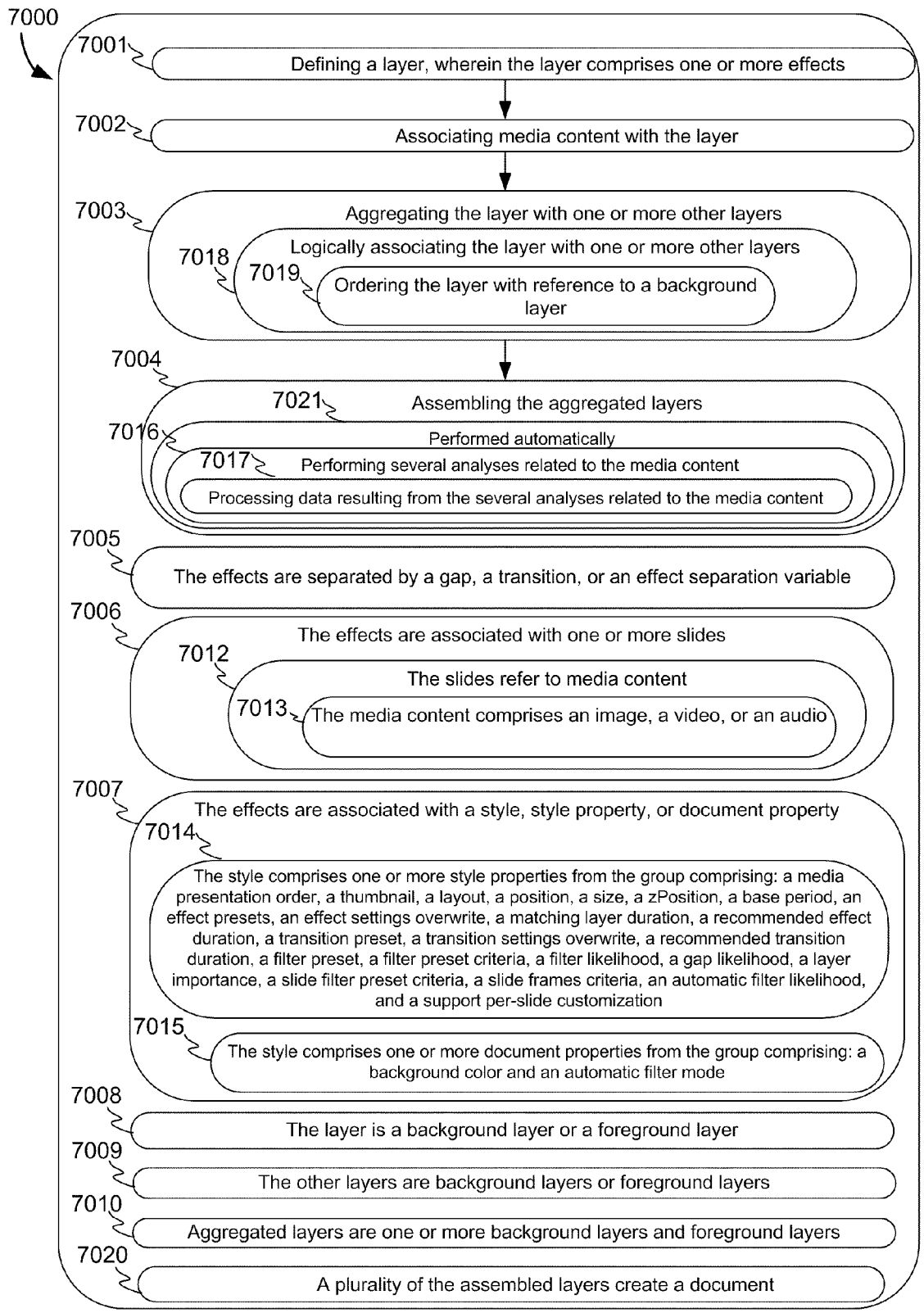
FIG. 7 illustrates an exemplary method in accordance with the present invention.

FIG. 7 illustrates an exemplary method in accordance with the present invention. The exemplary method 7000 comprises the computer-implemented steps of the exemplary method 6000 with the addition of steps 7005-7015. The exemplary method 7000 and, further, steps 7001-7015 may be implemented using an exemplary system such as that embodied in FIG. 4, which may execute the exemplary application 1000, and as described herein.

Figure 8:
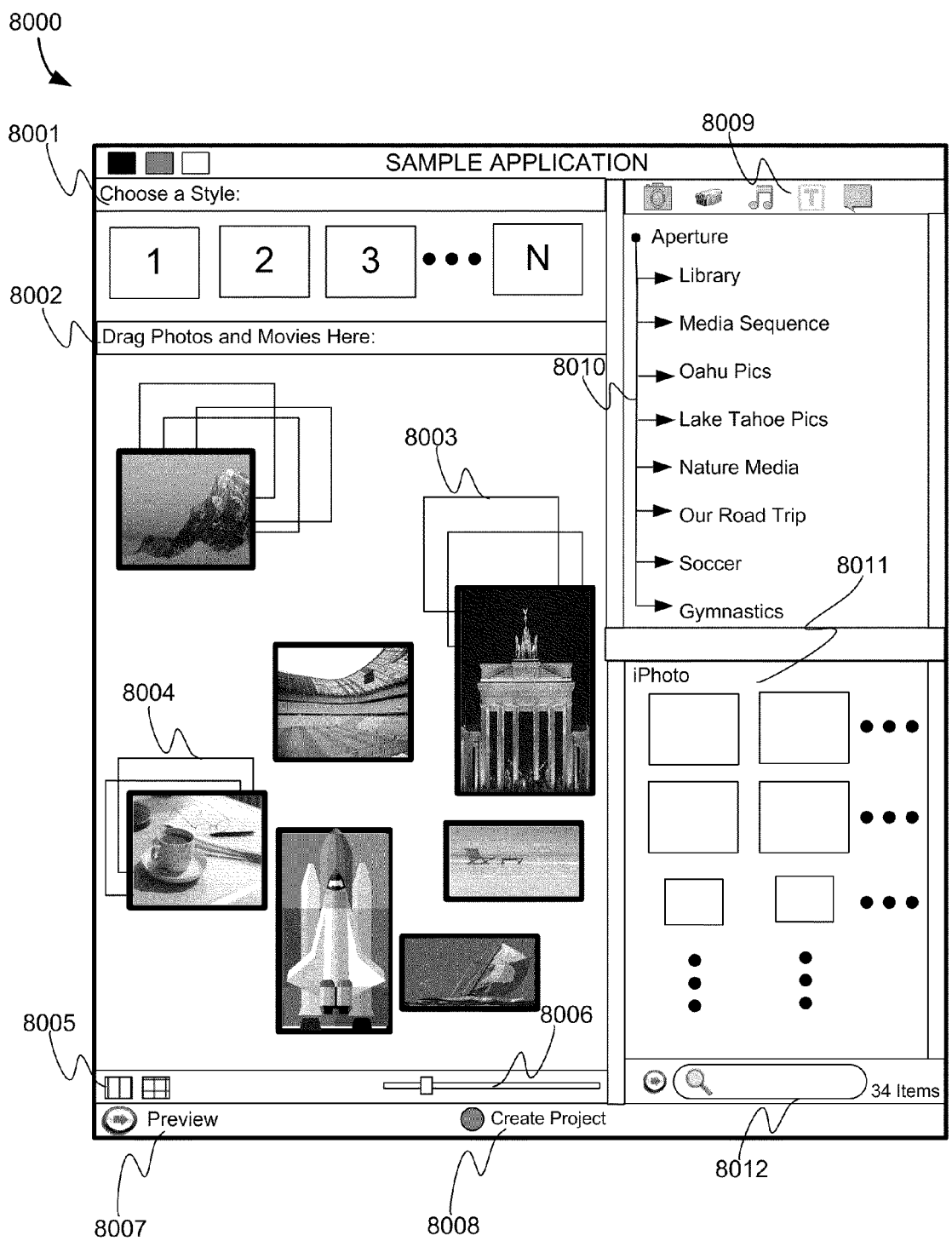
FIG. 8 illustrates an exemplary embodiment of an application in accordance with the present invention.

FIG. 8 illustrates an exemplary embodiment of an application in accordance with the present invention. The exemplary embodiment of an application 8000 comprises a create project feature 8008, choose style feature 8001 (also, FIG. 8B), a drag photos and movies (here) on light table feature 8002 (also, FIG. 8A) (e.g., steps 11004, 11006, 11013), a select media content menu 8009, a media content library feature 8010, a media content sub-library feature 8011 (also, FIG. 9), a search media content feature 8012, a preview slideshow/media presentation feature 8007, a play/preview slideshow/media presentation indicator 8006, a light table with organized media content 8003-8004, and an organize media content feature 8005. The application 8000 may be used for creating a slideshow/media presentation document with organized media content (e.g., 8003, 8004), where the creation and organization may be performed by the producer 3021 and other framework modules.

In some embodiments, a user may choose to create a slideshow/media presentation document using the create project feature 8008. The type of media content (e.g., images, videos, audio, or other compatible media content) (e.g., step 11007) to be used for creating the slideshow/media presentation document may be chosen using the select media content menu 8009, which may then access media content that may be stored locally 4006, remotely (accessible via network interface card 4004), or on an auxiliary device/component 4005 (e.g., steps 10001, 11001). The media content available according to the type of media content chosen using the select media content menu 8009 may then appear in a tree or other structured/organized manner accessible using the media content library feature 8010. The user may then choose one or more media content folders from the media content library 8010, whose contents may then appear in the media content sub-library feature 8011. The contents of the media content sub-library feature 8011 and the media content library feature 8010 may be searched using the search media content feature 8012 by keywords (or, some other alphanumeric-based characters), and the results may appear in the media content sub-library feature 8011. The search media content feature 8012 may be implemented using the producer 3021 or some other framework module.

In some embodiments, the user may choose a style using a choose style feature 8001. Instances of styles 8002B (or, effects) may comprise, for example, a flip-book, a pan-zoom, a holiday theme, a music theme, a chronology theme, a random theme, or some other style capable of being rendered (e.g., by renderer 3022) to a display device 4003. The style chosen by the user, or a default style, may be applied (or, coupled) to media content that is available via the light table feature 8002 such as, for example, photos dragged from the media content sub-library feature 8011 area to the light table feature 8002 area (e.g., steps 10002, 11002). As the style is applied to the media content available via the light table feature 8002, the producer 3021 or some other framework module analyzes meta data, media characteristics, or other media-related data of the media content (e.g., 10003, 11003). These analyses might include analyzing file characteristics, encoded data, tags/XML data, or by accessing media characteristics (e.g., camera/capture device make/model) or other media-related data. For example, meta data may be one or more of a time associated with the media content's creation, a rating associated with the media content (individually or in the aggregate), keywords associated with the media content, comments associated with the media content, a country/state/province/city associated with the media content, a longitude/latitude associated with the media content, or some other readable or extrapolated data. The producer 3021 or some other framework module may then organize the media content according to the results of the analyses (e.g., steps 10003, 11003); the organization may be invoked automatically upon the dragging of media content into the light table feature 8002 area or using the organize media content feature 8005. The organization of media content may appear on the light table feature 8002 area through, for example, the organization of media content on the light table 8003-8004 by the overlay of one instance of media content on another (e.g., like a stack of background and foreground layers 1004, 1005, with effect containers, effects, and slides) (e.g., step 11010), which may indicate a strong relation of one instance of media content to another; through the sharing of one or more borders, which may indicate a less than strong relation of one instance of media content to another; or, through no sharing of borders, which may indicate an even lesser than strong relation or no relation whatsoever between one instance of media content and another (e.g., step 11009). The media presentation/slideshow document that the producer 3021 or other framework modules create from the organized media content on the light table 8003-8004 may be then previewed as a document using the preview slideshow/media presentation feature 8007 (e.g., step 11004).

In some embodiments, styles, as may be ascertained from the foregoing exemplary instances 8002B, may determine the behavior of coupled media content in accordance with the behavior characteristics of the chosen style instance (e.g., step 11008). For example, the behavior of media content coupled with a flip-book style, as illustrated via the exemplary application 8000 playing a document that is being viewed via a display device 4003, may mimic the appearance of flipping through a book where the pages contain the coupled media content.

In some embodiments, the light table feature 8002 is implemented using a graphical user interface (GUI) (e.g., step 11006, 11013) where the organized media content 8003-8004 may be dynamically organized by the user, even after the automatic analyses and organization executed by the producer 3021 and the light table feature 8002 are completed.

Figure 8A:
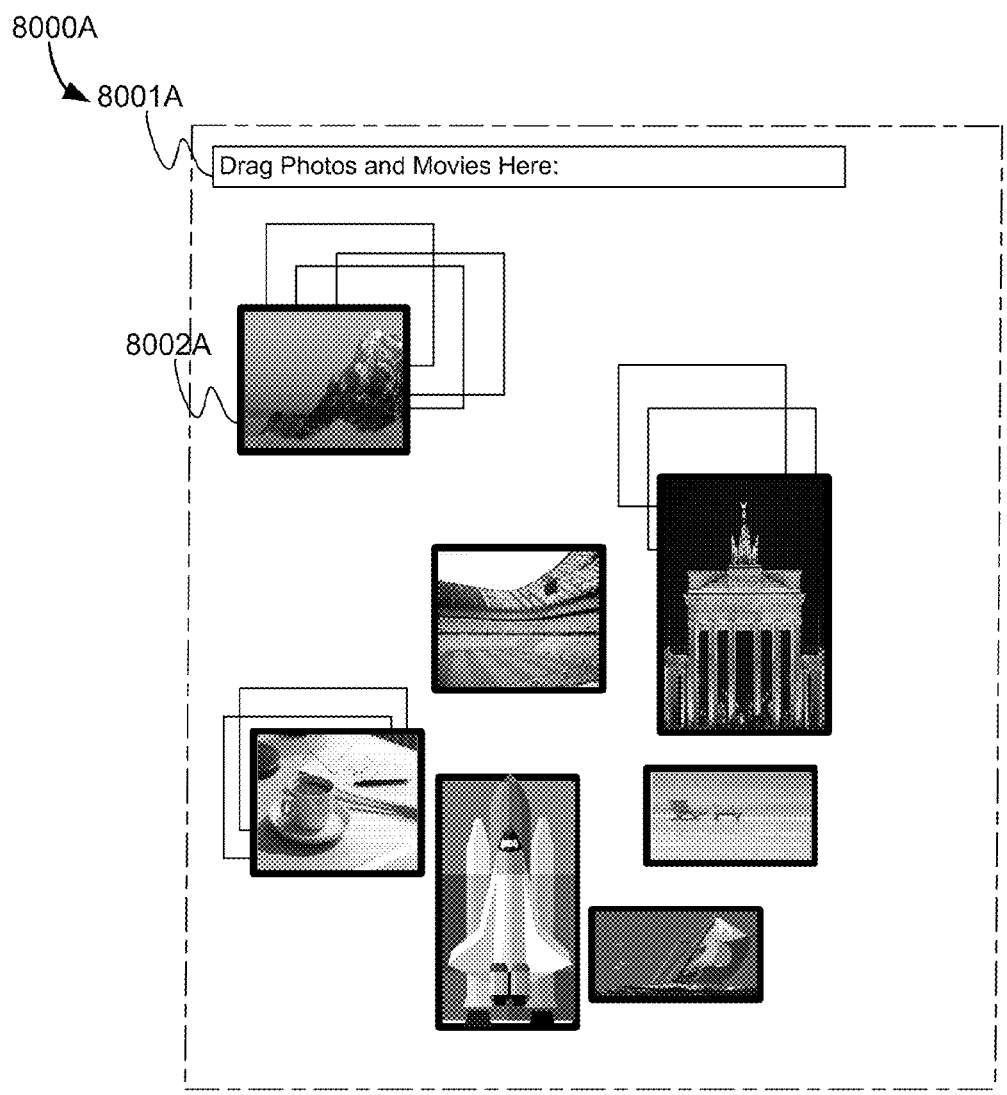
FIG. 8A illustrates features of an exemplary embodiment in accordance with the present invention.

FIG. 8A illustrates features of an exemplary embodiment in accordance with the present invention. The features of the exemplary embodiment comprise a drag photos and movies (here) on light table feature 8001A and a light table with organized media content 8002A (described above).

Figure 8B:
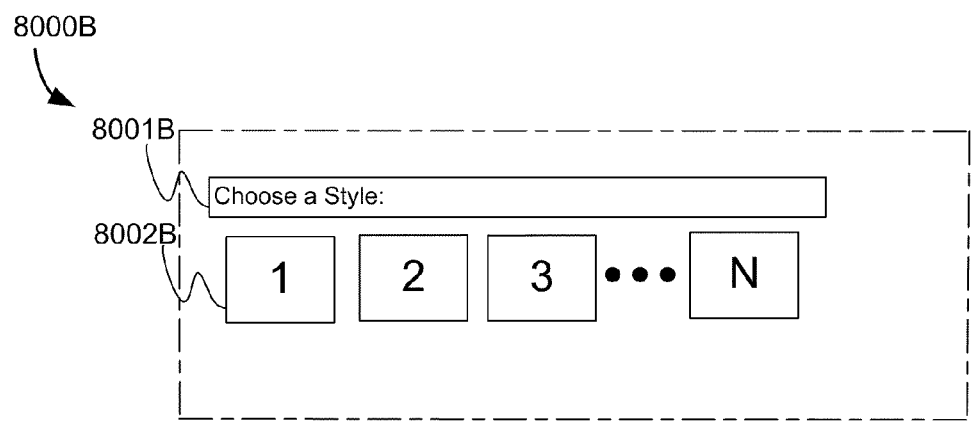
FIG. 8B illustrates features of an exemplary embodiment in accordance with the present invention.

FIG. 8B illustrates features of an exemplary embodiment in accordance with the present invention. The features of the exemplary embodiment comprise a choose style feature 8001B and a set of style instances 8002B (described above).

Figure 9:
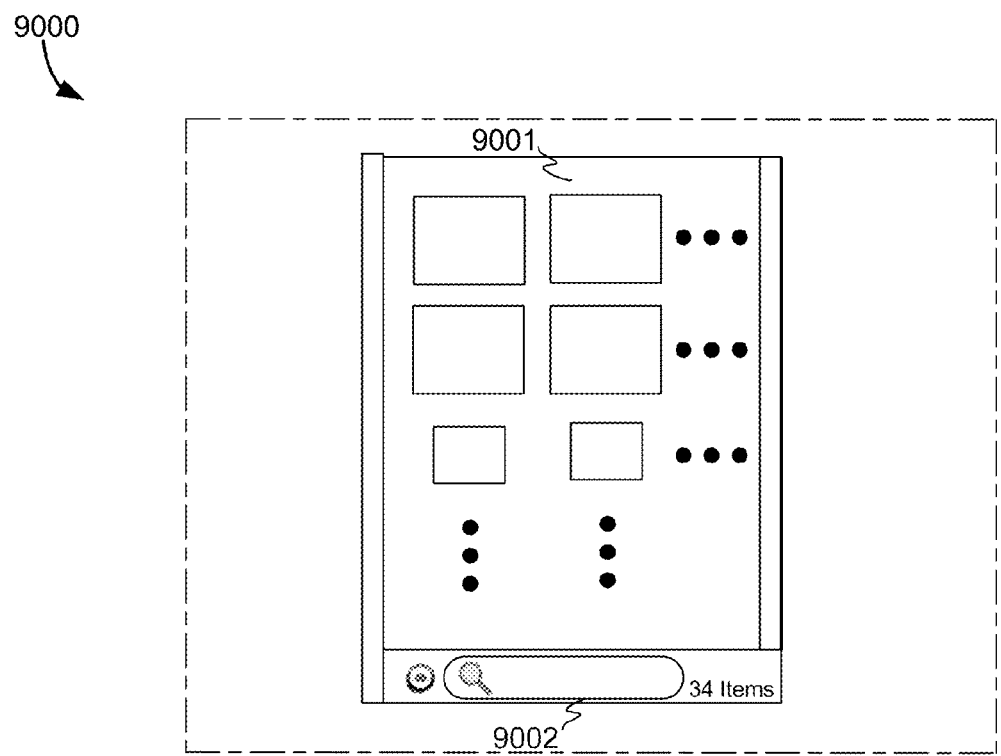
FIG. 9 illustrates features of an exemplary embodiment in accordance with the present invention.

FIG. 9 illustrates features of an exemplary embodiment in accordance with the present invention. The features of the exemplary embodiment comprise a media content sub-library feature 9001 and a search media content feature 9002 (described above).

Figure 10:
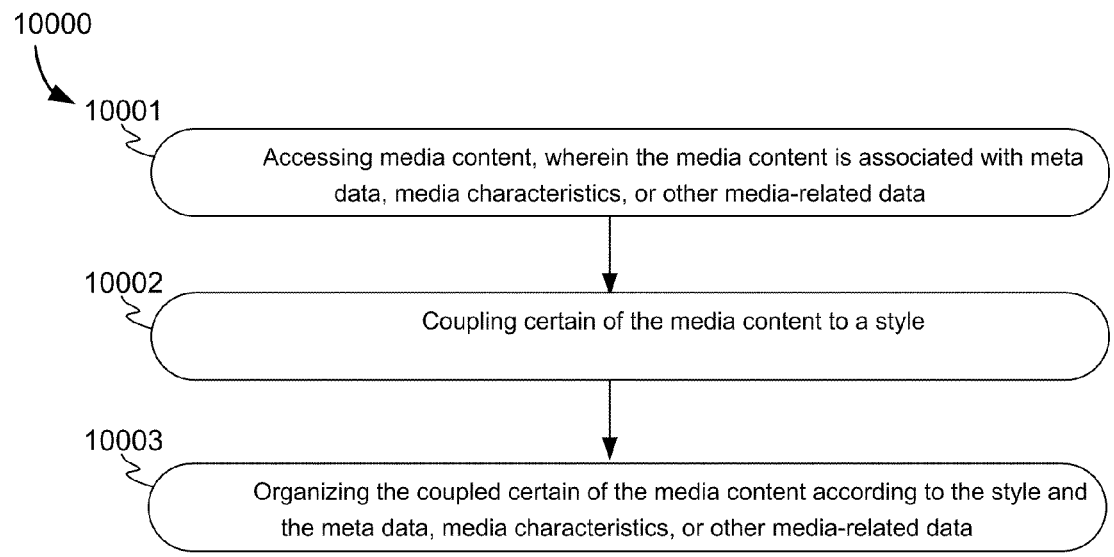
FIG. 10 illustrates an exemplary method in accordance with the present invention.

FIG. 10 illustrates an exemplary method in accordance with the present invention. The exemplary method 10000 comprises the following computer-implemented steps: accessing media content, wherein the media content is associated with meta data, media characteristics, or other media-related data 10001; coupling certain of the media content to a style 10002; and, organizing the coupled certain of the media content according to the style and the meta data, media characteristics, or other media-related data 10003. The exemplary method 10000 and, further, steps 10001-10003 may be implemented using an exemplary system such as that embodied in FIG. 4, which may execute the exemplary application 8000, and as described herein.

Figure 11:
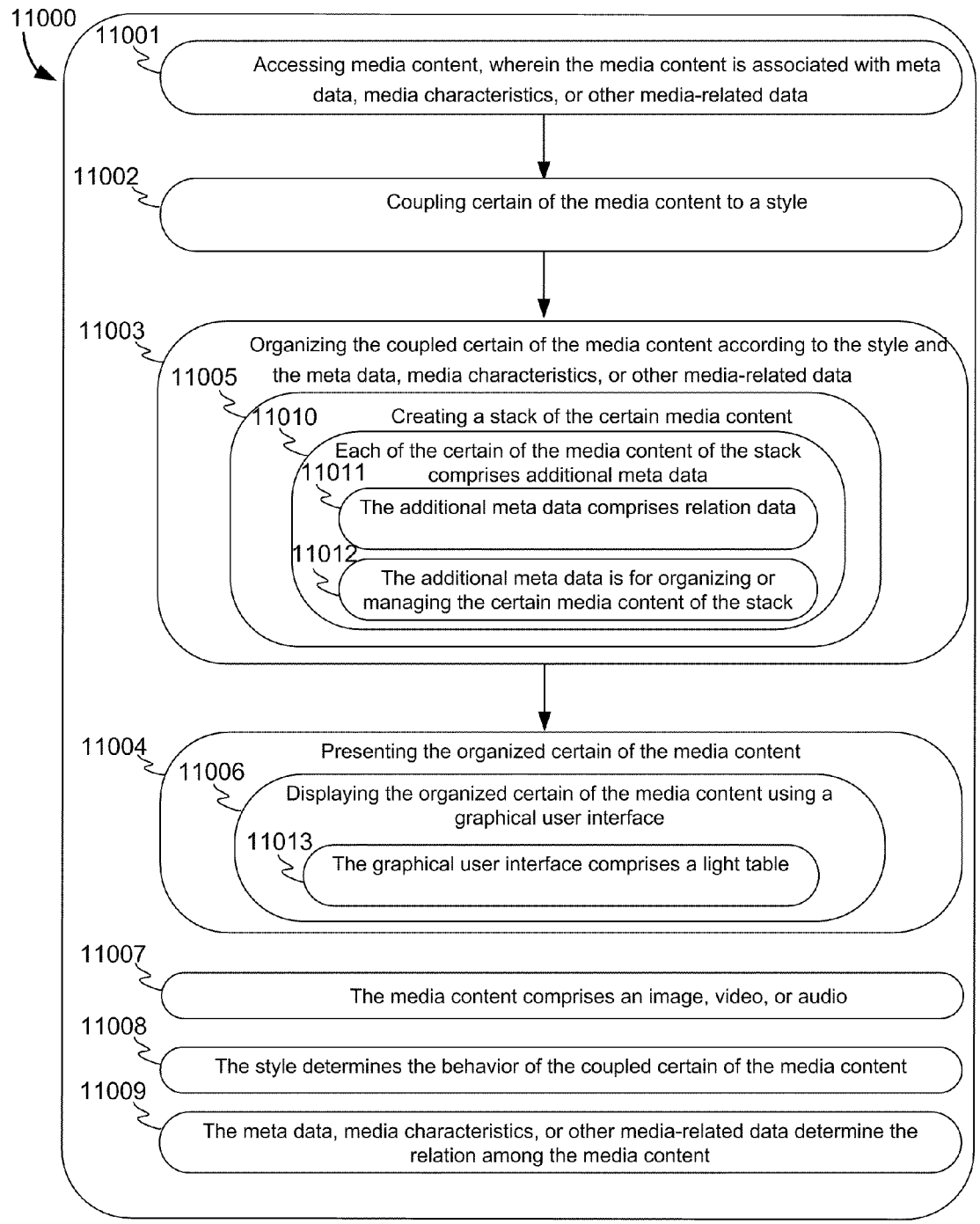
FIG. 11 illustrates an exemplary method in accordance with the present invention.

FIG. 11 illustrates an exemplary method in accordance with the present invention. The exemplary method 1 1000 comprises the computer-implemented steps of the exemplary method 10000 with the addition of steps 11004-11013. The exemplary method 11000 and, further, steps 11004-11013 may be implemented using an exemplary system such as that embodied in FIG. 4, which may execute the exemplary application 8000, and as described herein.

It will be apparent to those skilled in the art that various modifications and variations can be made to the present invention without departing from the spirit or scope of the invention. Thus, it is intended that the present invention cover the modifications and variations of this invention provided they come within the scope of the appended claims and their equivalents.

We claim:

1. A computer-implemented method for authoring media presentations, comprising:
    receiving a selection of media content by a processor-based system, the selection of media content being associated with meta data, media characteristics, or other media-related data;
    coupling the selection of media content to a style;
    detecting a drag-and-drop operation on the selection of media content, moving the selection of media content to a media authoring portion of a graphical user interface; and
    in response to the detecting the drag-and-drop operation, automatically organizing, by the processor-based system, the selection of media content into a stack with media content previously-moved into the media authoring portion, the stack organized according to the style and the meta data, media characteristics, or other media-related data of the selection of media content, the stack interposing a foreground layer over a background layer such that at least a portion of the background layer is obscured from view.

2. The computer-implemented method of claim 1, further comprising presenting the stack.

3. The computer-implemented method of claim 1, wherein the selection of media content comprises an image, video, or audio.

4. The computer-implemented method of claim 1, wherein the style determines the behavior of the selection of media content.

5. The computer-implemented method of claim 1, wherein the meta data, media characteristics, or other media-related data determine the relation among the selection of media content and the media content previously-moved into the media authoring portion.

6. The computer-implemented method of claim 1, wherein each media content of the stack comprises additional meta data.

7. The computer-implemented method of claim 6, wherein the additional meta data comprises relation data.

8. The computer-implemented method of claim 6, wherein the additional meta data is for organizing or managing the stack.

9. The computer-implemented method of claim 2, wherein the presenting comprises displaying the stack using a graphical user interface.

10. The computer-implemented method of claim 9, wherein the graphical user interface comprises a light table.

11. A system, comprising:
one or more processors;
memory;
one or more programs stored in memory, the one or more programs comprising instructions to:
receive a selection of media content, the selection of media content being associated with meta data, media characteristics, or other media-related data;
couple the selection of media content to a style;
detect a drag-and-drop operation on the selection of media content, moving the selection of media content to a media authoring portion of a graphical user interface; and
in response to the detecting the drag-and-drop operation, automatically organize the selection of the media content into a stack with media content previously-moved into the media authoring portion, the stack organized according to the style and the meta data, media characteristics, or other media-related data of the selection of media content, the stack interposing a foreground layer over a background layer such that at least a portion of the background layer is obscured from view.

12. The system of claim 11, further comprising the instruction to present the stack.

13. The system of claim 11, wherein the selection of media content comprises an image, video, or audio.

14. The system of claim 11, wherein the style determines the behavior of the selection of media content.

15. The system of claim 11, wherein the meta data, media characteristics, or other media-related data determine the relation among the selection of media content.

16. The system of claim 11, wherein each media content of the stack comprises additional meta data.

17. The system of claim 16, wherein the additional meta data comprises relation data.

18. The system of claim 16, wherein the additional meta data is to organize or manage the stack.

19. The system of claim 12, wherein the present instruction comprises the instruction to display the stack using a graphical user interface.

20. The system of claim 19, wherein the graphical user interface comprises a light table.

21. A computer-readable storage medium storing one or more programs configured for execution by a computer, the one or more programs comprising instructions to:
receive a selection of media content, the selection of media content being associated with meta data, media characteristics, or other media-related data;
couple the selection of media content to a style;
detect a drag-and-drop operation on the selection of media content, moving the selection of media content to a media authoring portion of a graphical user interface; and
in response to the detecting the drag-and-drop operation, automatically organize the selection of media content into a stack with media content previously-moved into the media authoring portion, the stack organized according to the style and the meta data, media characteristics, or other media-related data of the selection of media content, the stack interposing a foreground layer over a background layer such that at least a portion of the background layer is obscured from view.

\* \* \* \* \*